US010145497B2

(12) United States Patent
Fujii et al.

(10) Patent No.: US 10,145,497 B2
(45) Date of Patent: Dec. 4, 2018

(54) INNER RING

(71) Applicant: Nippon Pillar Packing Co., Ltd., Osaka-shi, Osaka (JP)

(72) Inventors: Makoto Fujii, Osaka (JP); Toshihide Iida, Osaka (JP)

(73) Assignee: NIPPON PILLAR PACKING CO., LTD., Osaka-Shi (JP)

( * ) Notice: Subject to any disclaimer, the term of this patent is extended or adjusted under 35 U.S.C. 154(b) by 411 days.

(21) Appl. No.: 14/888,138

(22) PCT Filed: Mar. 24, 2014

(86) PCT No.: PCT/JP2014/058001
§ 371 (c)(1),
(2) Date: Oct. 30, 2015

(87) PCT Pub. No.: WO2014/181589
PCT Pub. Date: Nov. 13, 2014

(65) Prior Publication Data
US 2016/0061360 A1    Mar. 3, 2016

(30) Foreign Application Priority Data
May 8, 2013  (JP) ................................ 2013-098311

(51) Int. Cl.
*F16L 19/028*  (2006.01)
*F16L 47/04*   (2006.01)
(Continued)

(52) U.S. Cl.
CPC .......... *F16L 19/028* (2013.01); *F16L 13/147* (2013.01); *F16L 15/08* (2013.01); *F16L 33/223* (2013.01); *F16L 47/04* (2013.01); *F16L 2201/44* (2013.01)

(58) Field of Classification Search
CPC ...... F16L 19/028; F16L 13/147; F16L 33/223
See application file for complete search history.

(56) References Cited

U.S. PATENT DOCUMENTS

| 5,743,572 | A | 4/1998 | Nishio |
| 6,409,222 | B1 | 6/2002 | Donocho et al. |
| 2006/0157975 | A1* | 7/2006 | Fujii ..................... F16L 19/028 285/247 |

FOREIGN PATENT DOCUMENTS

| EP | 0872678 A1 * | 10/1998 | ............ F16L 19/028 |
| GB | 1277718 | 6/1972 | |

(Continued)

OTHER PUBLICATIONS

International Search Report, dated Jun. 17, 2014 (Jun. 17, 2014), for PCT/JP2014/058001.

*Primary Examiner* — James M Hewitt, II
(74) *Attorney, Agent, or Firm* — Rankin, Hill & Clark LLP

(57) ABSTRACT

A pipe-connecting device including a resin-made tube and an inner ring. The inner ring has a flared portion and a tip-contracted outer-circumferential flared surface. The tip-contracted outer-circumferential flared surface is press-inserted into an end portion of the tube to cause the end portion of the tube to be flared and deformed. A section shape of the outer-circumferential flared surface in a direction extending along an axis of the inner ring body is formed into a convex curved surface passing through a first place, which is a maximum-diameter portion of the flared portion, a second place, which is the tip end side of the flared portion of the inner ring body, and a third place, which is between the first place and the second place, and in which a diameter is equal to an outer diameter of the tube with respect to the axis.

2 Claims, 13 Drawing Sheets

(51) Int. Cl.
*F16L 33/22* (2006.01)
*F16L 13/14* (2006.01)
*F16L 15/08* (2006.01)

(56) References Cited

FOREIGN PATENT DOCUMENTS

| | | |
|---|---|---|
| JP | 50-109214 | 9/1975 |
| JP | 52-84013 | 6/1977 |
| JP | H03-041285 | 2/1991 |
| JP | 10-54489 | 2/1998 |
| JP | H10-196867 | 7/1998 |
| JP | 2001-041364 | 2/2001 |
| JP | 2008-194799 | 8/2008 |
| JP | 2012-193758 | 10/2012 |
| JP | 2013-100874 | 5/2013 |
| JP | 2013-100875 | 5/2013 |

\* cited by examiner (a)

(b)

(a)

(b)

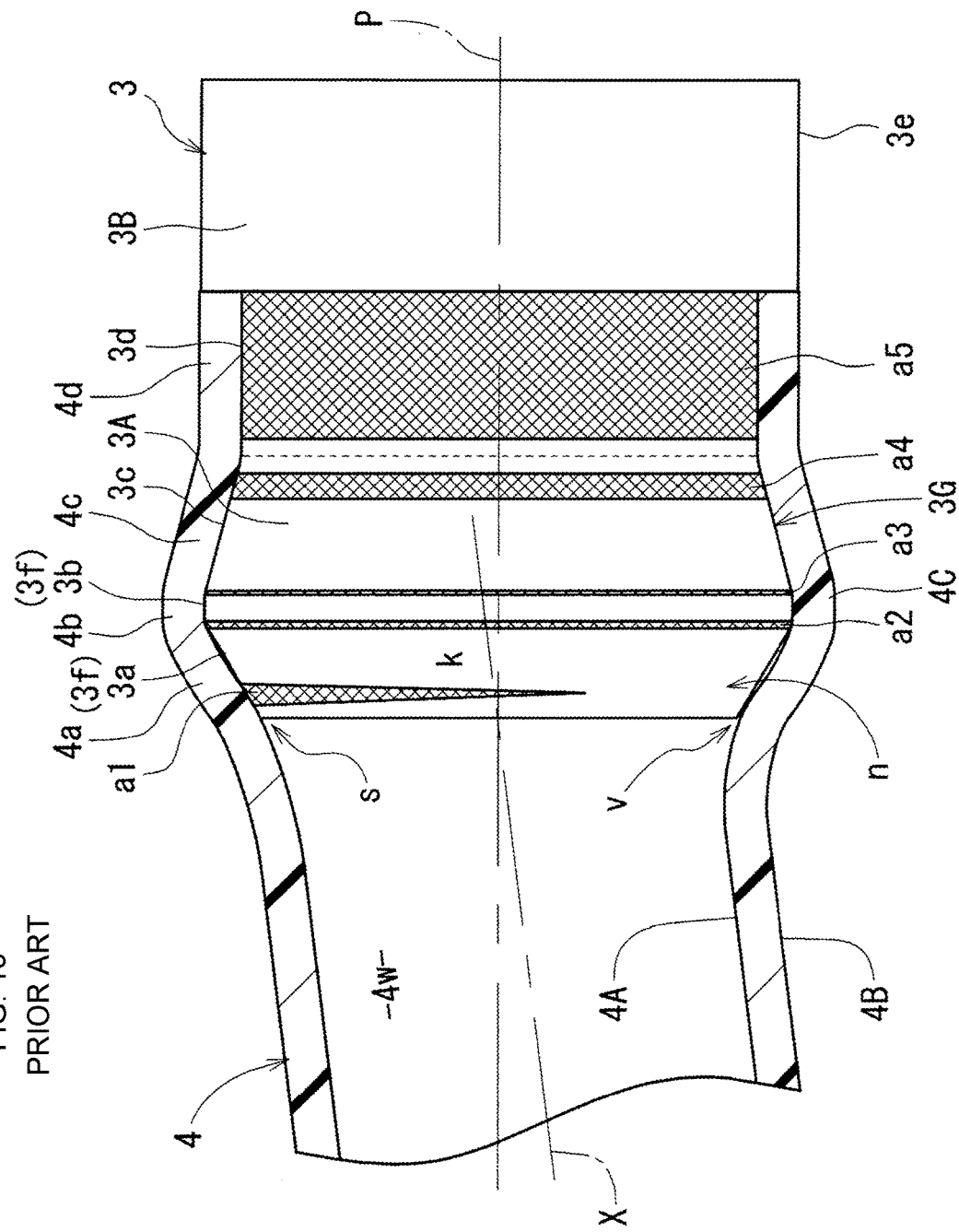

INNER RING

TECHNICAL FIELD

The present invention relates to an inner ring which is used for connecting a resin-made tube to a pipe-connecting device (for example, a pipe joint or a fluid apparatus), and more particularly to an inner ring which is preferred for connecting a tube for allowing a liquid having high purity or ultrapure water that is handled in various technical fields such as production of semiconductor devices, production of medical equipment and medicines, food processing, and chemical industry, to flow therethrough.

BACKGROUND ART

As a technique for connecting a resin-made tube by using an inner ring, for example, the technique disclosed in Patent Literature 1 is known.

The configuration disclosed in Patent Literature 1 includes: a tubular screwing portion which is disposed in a pipe joint in a state where an external thread is formed on the outer circumference; an inner ring in which the inner circumferential portion is formed as a fluid passage, and an annular large-diameter portion is raised on the radially outward side, and which is used for fixing a pipe; and a union nut on which an internal thread to be screwed with the external thread is formed.

When a tube is to be connected to the pipe joint, the inner ring is first press-inserted into an end portion of the tube from an opening of the tube, and the end portion of the tube is flared and deformed by the annular large-diameter portion.

Next, the tube which is flared and deformed, and which has the inner ring is inserted into the tubular screwing portion.

Next, the internal thread of the union nut is screwed with the external thread of the tubular screwing portion.

Then, the union nut is screw-advanced, and this screw advancement causes the union nut to press the tube having the inner ring in the axial direction, thereby performing the connection of the tube.

The press insertion of the inner ring into the end portion of the tube from the opening of the tube is performed by using a dedicated press-insertion jig (press-insertion device).

The forced press insertion which is performed by using a press-insertion jig (press-insertion device) is disclosed in, for example, Patent Literature 2 and Patent Literature 3.

In the configurations disclosed in Patent Literature 2 and Patent Literature 3, an inner ring is fitted to an pushing mechanism, a tube is fixed to a clamp jig so that an end portion of the tube is projected, and the inner ring is pressed in the axial direction by operating the pushing mechanism, to be press-inserted into the end portion of the tube from an opening of the tube.

In the press-insertion jig (press-insertion device), in order to allow the tube and the inner ring to be press-inserted straightly and tightly to each other, the relative positions and directions of the axes of the clamp jig and the pushing mechanism are accurately coincident with each other.

When the tube and the inner ring are press-inserted to each other while their axes X, P are not inclined to each other, the following configuration is attained.

As shown in FIG. 12, the inner circumferential surface of the end portion 4C of the tube 4, and the outer circumferential portion 3G of the inner ring 3 are annularly press-contacted with each other in critical places as illustrated by the cross hatchings. Therefore, an annular sealed state which is uninterrupted (without a missing annular part) is configured in all of the critical places.

A case where the conventional inner ring 3 shown in FIG. 11 is press-inserted into the end portion 4C of the tube 4 while their axes X, P are not inclined to each other and are coincident with each other will be further described with reference to FIG. 12. The following configuration is attained.

In the conventional inner ring 3 shown in FIG. 11, first, a flared portion 3f having an outer-circumferential flared surface 3a which is tip-contracted in a conical manner, and a maximum-diameter portion 3b is formed, an outer circumferential portion 3c which is tip-expanded in a conical manner is formed from the maximum-diameter portion 3b of the flared portion 3f, and a linear trunk outer-circumferential portion 3d having the same diameter is formed from the outer-circumferential portion 3c.

When the inner ring 3 is press-inserted into the end portion 4C of the tube 4, an annular first press-contact portion a1 shown in FIG. 12 is configured in a tip-end front portion in the outer-circumferential flared surface 3a, an annular second press-contact portion a2 shown in FIG. 12 is configured in a range from a position between the outer-circumferential flared surface 3a and the maximum-diameter portion 3b, to the maximum-diameter portion 3b, an annular third press-contact portion a3 shown in FIG. 12 is configured in a range from the maximum-diameter portion 3b to a position between the maximum-diameter portion 3b and the tip-expanded outer-circumferential portion 3c, a fourth press-contact portion a4 is formed between the tip-expanded outer-circumferential portion 3c and the trunk outer-circumferential portion 3d, and an annular fifth press-contact portion a5 shown in FIG. 10 is configured in a large part of the trunk outer-circumferential portion 3d.

When the annular first to fifth press-contact portions a1 to a5 are configured as described above, the boundary between the end portion 4C of the tube 4 and the inner ring 3 is satisfactorily sealed, no fluid leakage occurs, and no space into which a fluid can enter is formed between the end portion 4C and the inner ring 3.

In an actual press-inserting work, however, there is a case where the ideal state where the press insertion of the tube and the inner ring is performed while there axes are not inclined to each other and are coincident with each other is not attained as described above. The case where the ideal state is not attained has intensively studied, and it is found that the case is caused mainly by following reasons (1) to (3).

(1) The resin-made tube is fixed to the clamp jig, and an end portion of the tube is projected. The inner ring is forcedly pressed by the pushing mechanism to be press-inserted into the projected end portion of the tube. During the press-insertion, therefore, the projected end portion of the tube is sometimes somewhat bent and deformed. When such bending deformation occurs, there is a case where the insertion is performed while the axis of the inner ring is slightly inclined to that of the end portion of the tube.

(2) An end surface of a tube which is manually cut in the site is not always cut perpendicularly to the axis of the tube, and sometimes cut in a state where the end face is slightly inclined.

When the inner ring is pressed against and press-inserted into the tube in which the end surface is slightly inclined, a time difference is produced so that the press insertion is sequentially performed with starting from a portion which is most axially projected in the tube.

Therefore, the friction force due to the press insertion is not applied simultaneously and uniformly to the whole circumference of the tube, but sequentially applied while being biased in the circumferential direction. Similarly with (1) above, there is a case where the insertion is performed while the axis of the inner ring is slightly inclined to that of the end portion of the tube.

(3) The resin-made tube is continuously extrusion-molded and then delivered in a state where the tube is wound around a cable core. The wound tube is curled, and therefore corrected so as to have a straight shape. However, it is difficult to completely remove the curl, and it is often that the tube is slightly axially bent.

Depending on the degree of the curl, when the curl is large, there is a case where the inner ring is not inserted while that axis of inner ring is straight to that of the end portion of the tube, but press-inserted while being slightly inclined.

Because of these reasons, the axis of the tube is inclined to that of the inner ring. The inclination of the tube is small or about 1 degree at the most in terms of the inclination of the axes. When the axes are inclined to each other, however, there arise the following problems.

As shown in FIG. 13, namely, the second to fifth press-contact portions a2 to a5 exhibit a press-contacting situation similar to that shown in FIG. 12, but the first press-contact portion a1 is formed as a narrow strip-shaped region in a tip end portion of the inner ring 3 where the rigidity of the tube 4 acts in the outer-circumferential flared surface 3a of a conical surface, and diameter reduction and deformation easily occur.

While the maximum-diameter portion 3b of the inner ring 3 is press-contacted with the inner circumferential surface 4A of the tube 4, the end portion 4C of the tube 4 is inclined to the axis X with starting from the press-contact portion. Therefore, the narrow first press-contact portion a1 is not formed into an annular shape, and is intermittent in the circumferential direction, and a surface-pressure reduced portion n or a non-contact portion n is produced.

When the surface-pressure reduced portion n or the non-contact portion n is produced, the fluid is caused by the capillary action to penetrate from the place formed as the surface-pressure reduced portion n or the non-contact portion n into a gap portion k between the outer-circumferential flared surface 3a and a tip-contracted press-contact portion 4a which is obtained by enlargedly deforming the tube 4. The higher the permeability of the fluid, the higher the penetration degree. There is a possibility that the penetration reaches to the vicinity of the maximum-diameter portion 3b.

The existence of the surface-pressure reduced portion n or the non-contact portion n can be known from the presence or absence of a flaw detection penetrant which, after the inner ring 3 is press-inserted into the tube 4, and they are impregnated in the flaw detection penetrant for a given time period, penetrates between the inner ring 3 and the tube 4.

When the fluid penetrates to the gap portion k (see FIG. 13), there arise the following defects.

Even when the interiors of the tube 4 and the pipe joint are washed and then a next fluid is flown, the former old fluid remains in the gap portion k, and oozes out from the surface-pressure reduced portion n or the non-contact portion n, and is mixed with the replaced new fluid. Therefore, defects such as that the purity of the new fluid is lowered, that the new fluid is modified, and that, in order to prevent as far as possible the mixture from occurring, a lot of time, washing fluid, and replacement fluid are consumed in washing and replacement are caused.

PRIOR ART LITERATURE

Patent Literature

Patent Literature 1: Japanese Patent Application Laid-Open No. 10-054489
Patent Literature 2: Japanese Patent Application Laid-Open No. 2001-041364
Patent Literature 3: Japanese Patent Application Laid-Open No. 2008-194799

SUMMARY OF THE INVENTION

Problems to be Solved by the Invention

It is an object of the invention to provide an inner ring in which, even in the case where the inner ring is inclinedly press-inserted into an end portion of a tube, it is possible to prevent a fluid from penetrating, from the tip end side of an outer-circumferential flared surface of the inner ring, between the tube and the outer-circumferential flared surface of the inner ring, thereby eliminating the above-described defects.

Means for Solving the Problems

According to the present invention, in an inner ring in which a flared portion 3f is formed in an outer circumferential portion 3G of an inner ring body 3A that is to be press-inserted into a resin-made tube 4, and a tip-contracted outer-circumferential flared surface 3a which is press-inserted into an end portion 4C from an opening of the tube 4 to cause the end portion 4C of the tube 4 to be flared and deformed is formed in a tip end side of the flared portion 3f, it is characterized in that a section shape of the outer-circumferential flared surface 3a in a direction extending along an axis P of the inner ring body 3A is formed into a convex curved surface passing through: a first place e1 which is a maximum-diameter portion 3b of the flared portion 3f; a second place e2 which is a tip end on a side of the tube press insertion; and a third place e3 which is between the first place e1 and the second place e2, and in which a diameter is equal to an outer diameter D of the tube 4 with respect to the axis P.

Further according to the present invention, in the inner ring, seal element portions 14, 15 which are press-contacted with seal configuring portions m, 1a disposed in a pipe connecting device A to constitute inner seal portions S3, S4 are formed in a basal-end side of the inner ring body 3A.

Effects of the Invention

In further accordance with the present invention, the section shape of the outer-circumferential flared surface 3a in the direction extending along the axis P of the inner ring body 3A is formed into the convex curved surface passing through: the first place e1 which is the maximum-diameter portion 3b of the flared portion 3f; the second place e2 which is the tip end on the side of the tube press insertion; and the third place e3 which is between the first place e1 and the second place e2, and in which the diameter is equal to the outer diameter D of the tube 4 with respect to the axis P. Therefore, a wide range of the outer-circumferential flared surface 3a of the inner ring 3 is in contact with the inner circumferential portion of the tube end portion 4C, and a wide press-contact portion which stretches as wide as the whole of the outer-circumferential flared surface 3a of the inner ring 3 can be formed between the outer-circumferential flared surface 3a of the inner ring 3 and the inner circumferential portion of the tube 4.

Even when the inner ring body 3A is press-inserted into the tube 4 while being somewhat inclined to each other, therefore, the press-contact portion which is formed between the end portion 4C of the tube 4 and the outer-circumferential flared surface 3a of the inner ring body 3A is not interrupted, and a substantially whole of the portion in the circumferential direction is surely press-contacted, whereby a situation where the fluid penetrates therebetween from the tip end side of the outer-circumferential flared surface 3a can be effectively prevented from occurring.

As a result, it is possible to eliminate the above-described defects, i.e., the defects such as that the old fluid which is previously flown is collected in the gap portion k, and oozes out from the surface-pressure reduced portion n or the non-contact portion n, and is mixed with the replaced new fluid, and, therefore, the purity of the new fluid is lowered, the new fluid is modified, and that, in order to prevent the mixture from occurring, a lot of time, washing fluid, and replacement fluid are consumed in washing and replacement.

When, the seal element portions (14 or/and 15) which are press-contacted with the seal configuring portions (m or/and 1a) disposed in the pipe connecting device A to constitute the inner seal portions (S3 or/and S4) are formed in the basal-end side of the inner ring body 3A, the inner side (basal-end side) can be sealed by the relationship between the inner ring body 3A and the pipe connecting device A, and the inner seal enables a situation where the fluid enters from the inner side to the space between the inner ring body 3A and the end portion 4C of the tube 4, to be thoroughly avoided.

BRIEF DESCRIPTION OF THE DRAWINGS

FIG. 13 is a sectional view showing a situation of inadequate press contact between the conventional inner ring and the tube.

MODE FOR CARRYING OUT THE INVENTION

Hereinafter, embodiments of the inner ring of the invention will be described with reference to the drawings. In a pipe-connecting device A shown in FIGS. 4, 5, and 10 and the like, three axes, i.e., the axis Y of a pipe joint body 1, the axis P of an inner ring 3, and the axis X of a tube 4 are drawn so that they are identical ones arranged on the same straight line (the axis Y=the axis P=the axis X).

Figure 4:
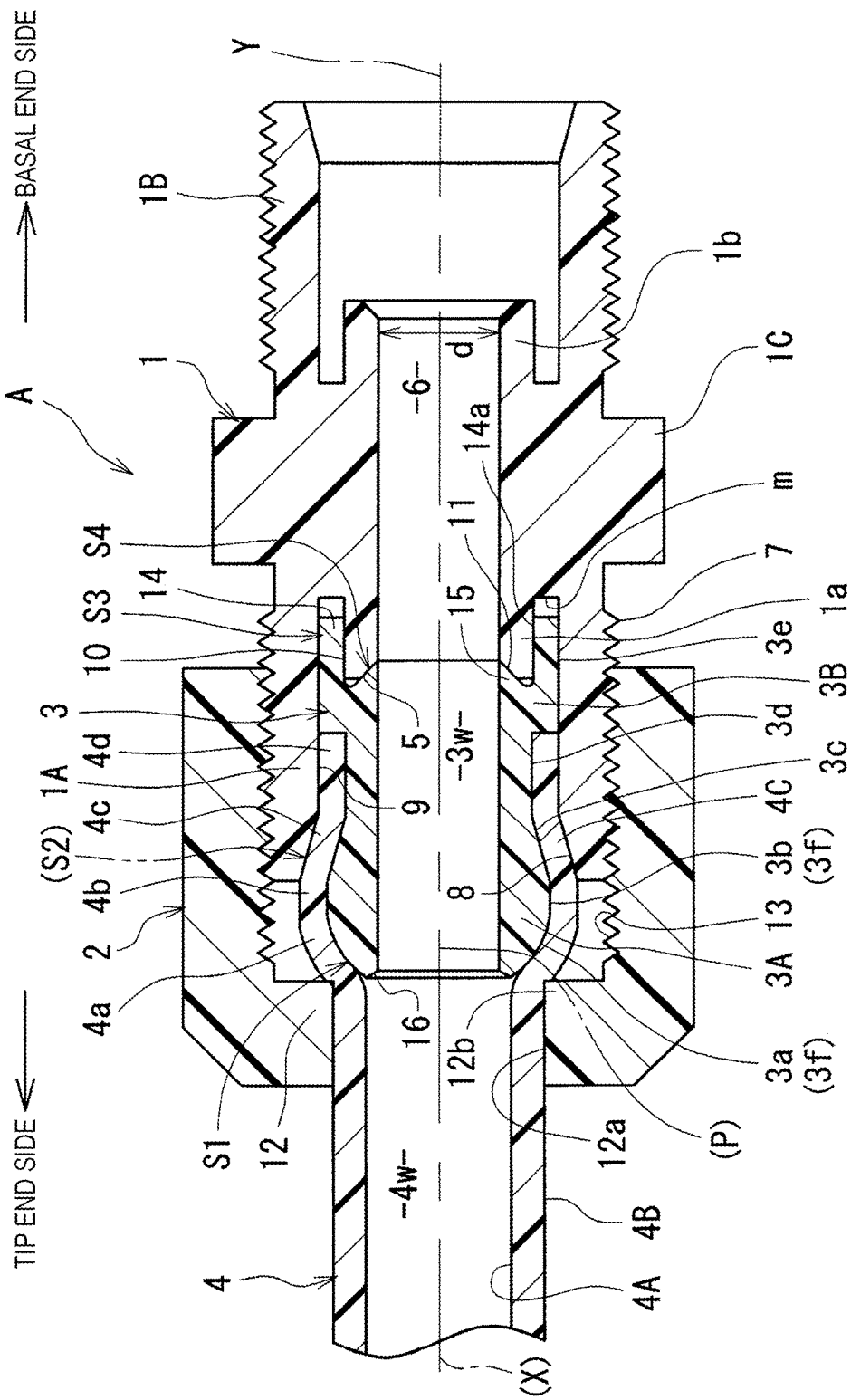
FIG. 4 is a sectional view of a state where a tube is connected to a pipe connecting device by using the inner ring of FIG. 1.
Figure 5:
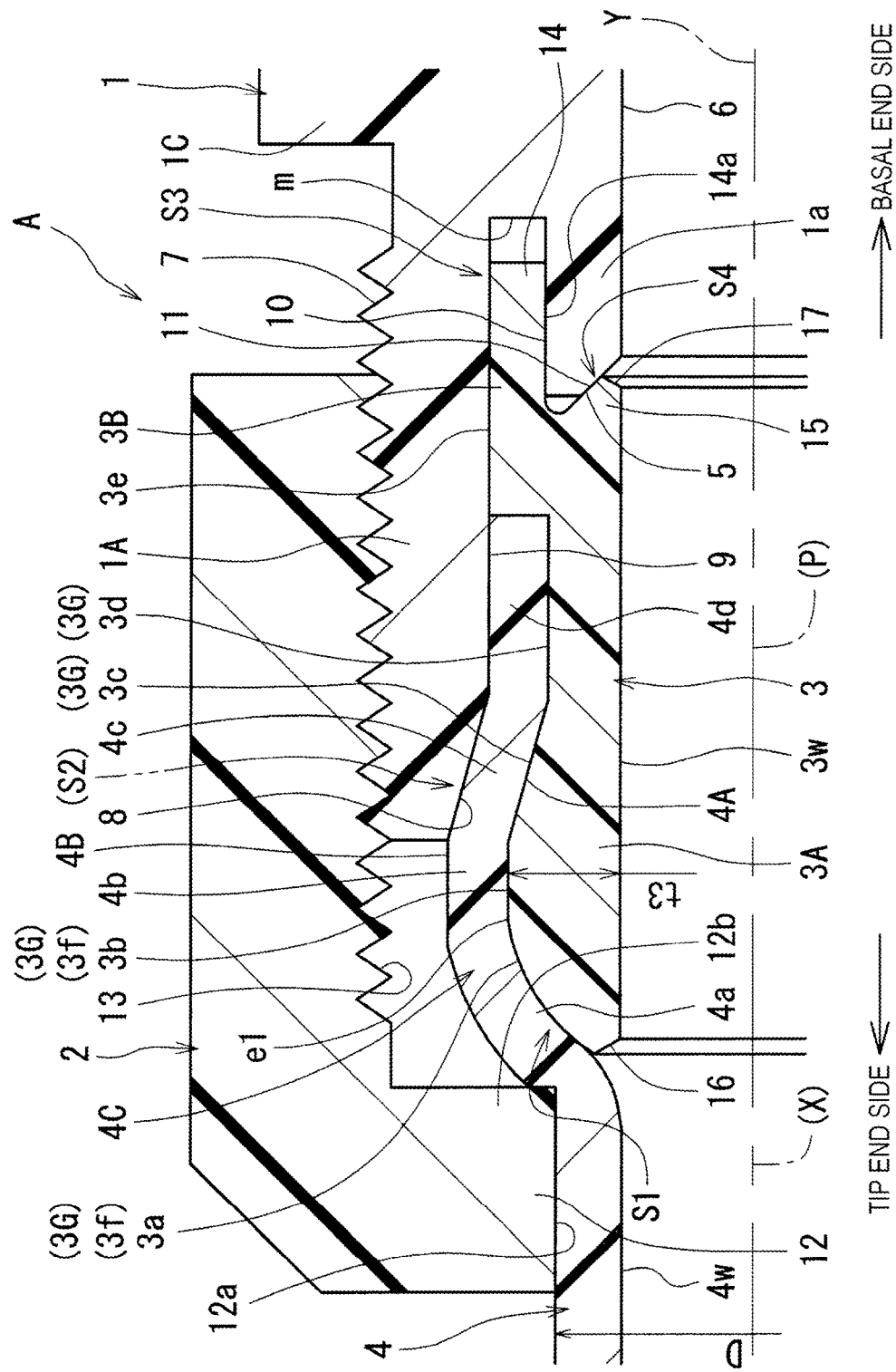
FIG. 5 is an enlarged sectional view showing main portions of FIG. 4.

In the specification, it is defined that "tip end side" and "tip end" in components of the pipe joint body 1, a union nut 2, the inner ring 3, and the tube 4 indicate the side (or the direction) in which the tube 4 separates from the pipe joint body 1 in the direction of the axis Y in FIGS. 4, 5, and the like, and "basal end side" and "basal end" indicate the side (or the direction) in which the tube 4 approaches the pipe joint body 1 in the direction of the axis Y.

Embodiment 1

Figure 1:
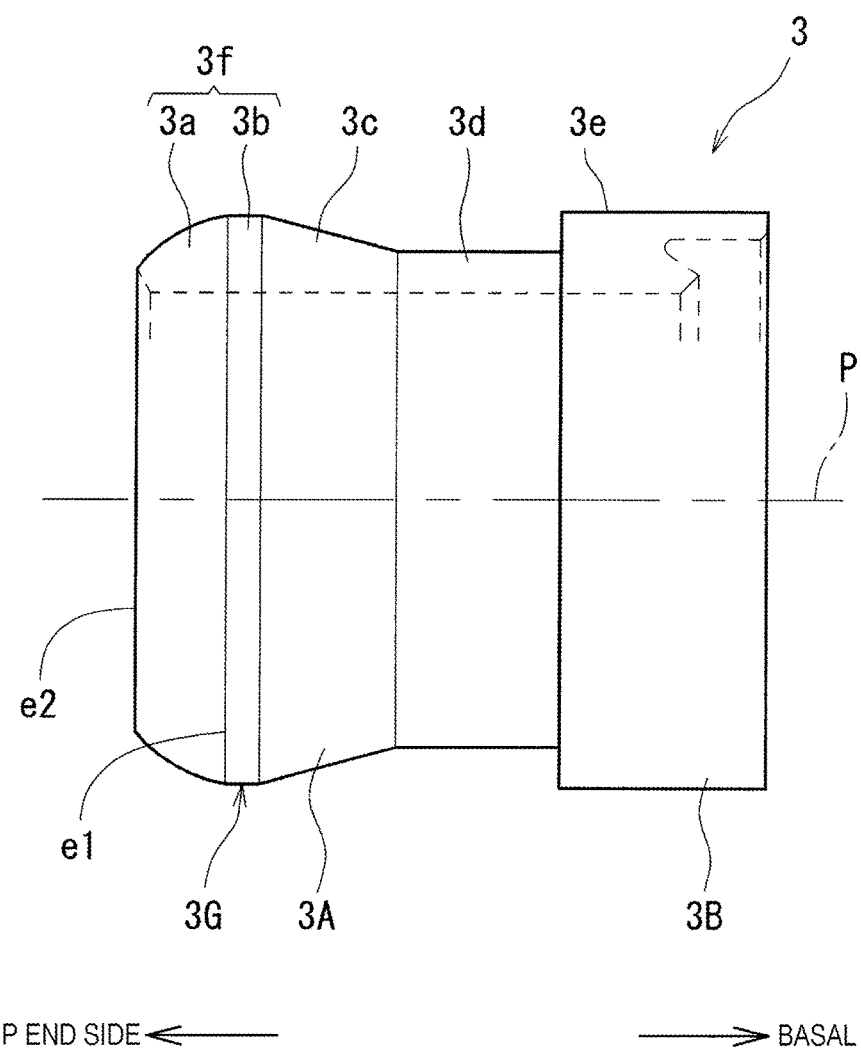
FIG. 1 is a side view of an inner ring (Embodiment 1).
Figure 2:
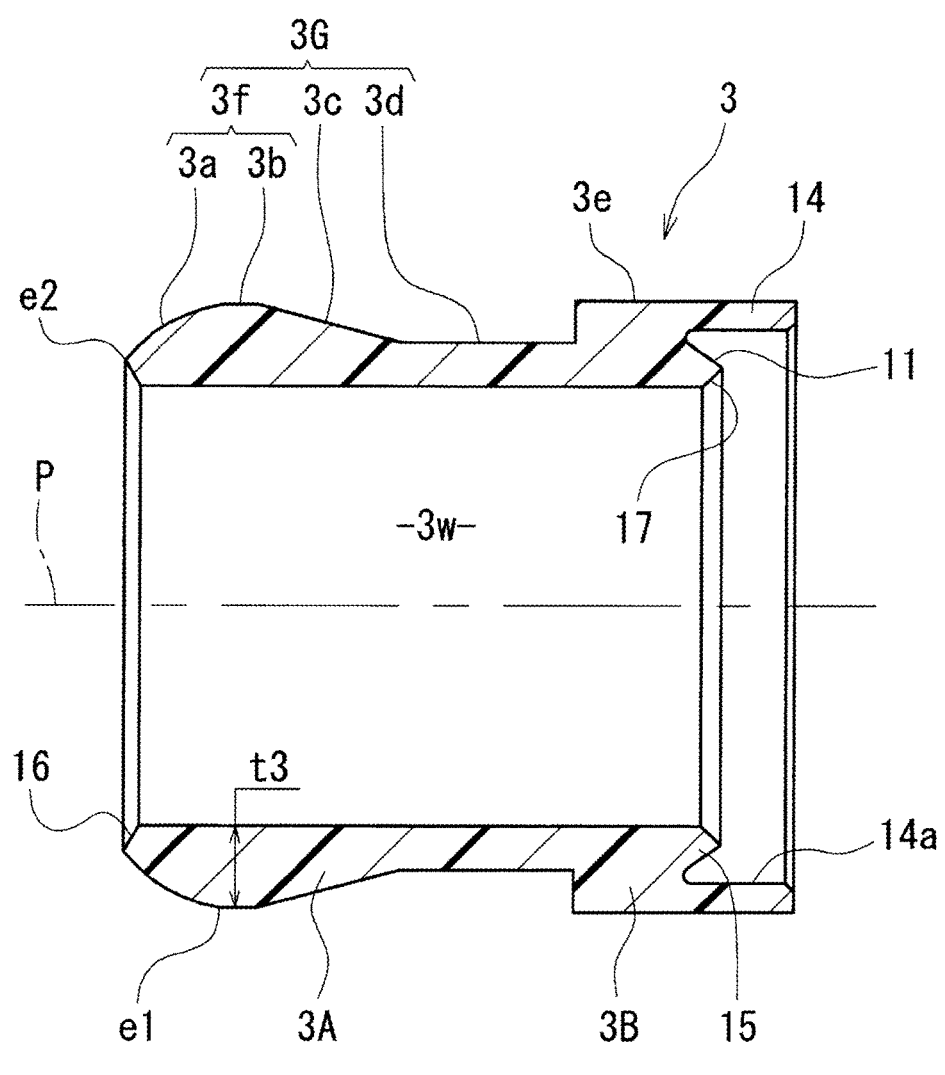
FIG. 2 is a sectional view of the inner ring of FIG. 1.
Figure 3:
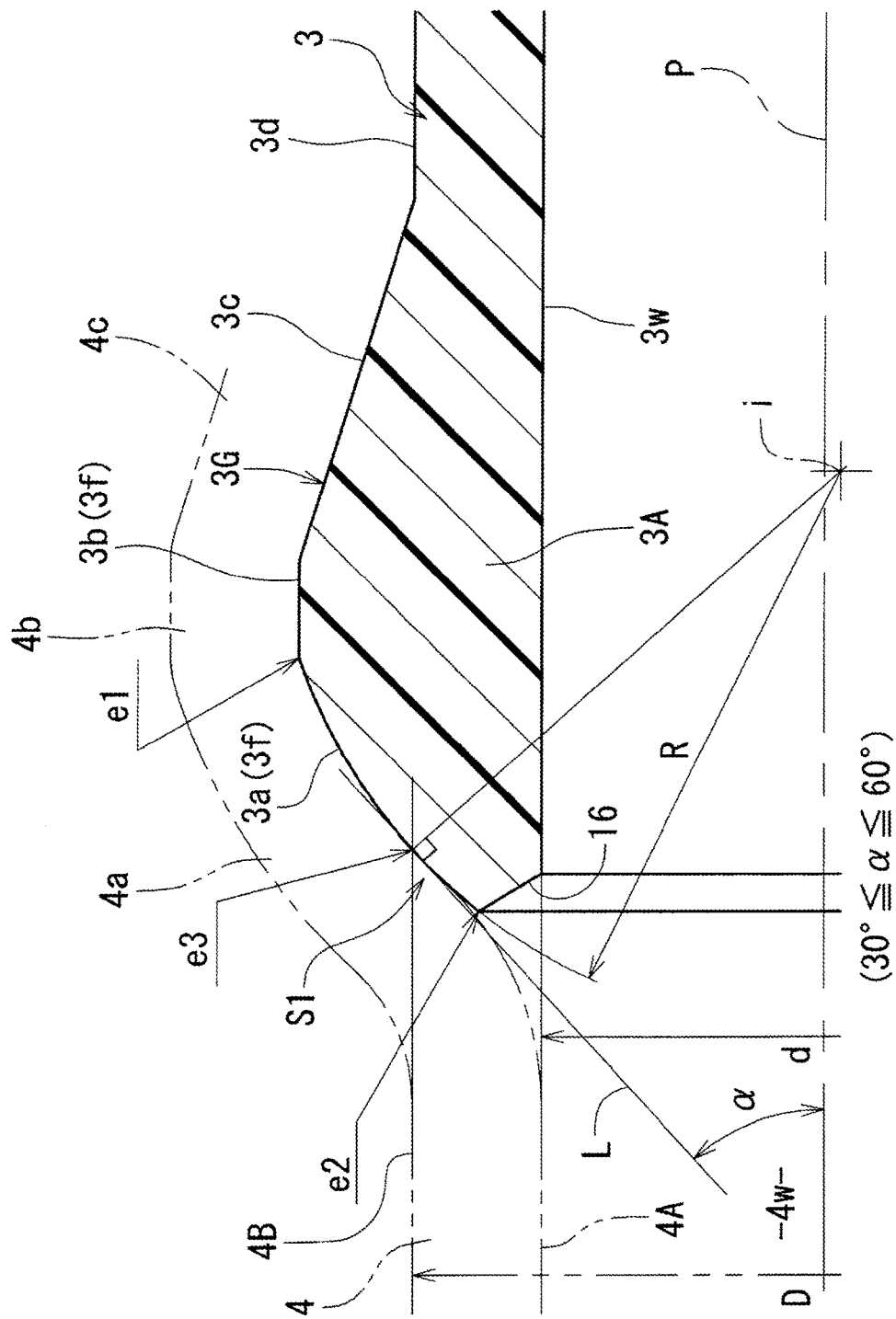
FIG. 3 is an enlarged sectional view of main portions and showing the shape of a tip-end side of the inner ring of FIG. 1.

FIGS. 1 to 3 show the inner ring 3, and FIGS. 4 and 5 show the pipe-connecting device A to which the tube 4 is connected by using the inner ring 3.

The pipe-connecting device A is configured by a pipe joint through which tubes are connected to each other, has the pipe joint body 1, the union nut 2, and the inner ring 3, and is used for communicatingly connecting the tube 4 in a state where the inner ring body 3A is press-inserted into a tube end portion 4C which is an end portion of a tube.

All of the pipe joint body 1, the union nut 2, the inner ring 3, and the tube 4 are made of a resin such as a fluorine resin (for example: PTFE, PFA, ETFE, CTFE, or ECTEF) having excellent heat resistance and chemical resistance.

When the pipe joint body 1, the inner ring 3, and the tube 4 are made of the above-mentioned fluorine resin, the union nut 2 may be formed by a resin such as polyamide, polypropylene, or polyethylene. All of the pipe joint body 1, the union nut 2, the inner ring 3, and the tube 4 may be formed by a resin such as polyamide, polypropylene, or polyethylene.

The pipe joint body 1 has a tubular structure having: a tubular trunk portion 1C; a tubular screwing portion 1A which is disposed in its tip end side in the direction of the axis Y; a tubular receiving port 1B which is disposed in its basal end side in the direction of the axis Y; one small-diameter tubular portion 1a which is formed on the radially inward side of a root portion of the tubular screwing portion 1A; another small-diameter tubular portion 1b which is formed on the radially inward side of the receiving port 1B; and an internal flow path 6 which is configured by an inner circumferential surface (not designated by a reference numeral). For example, the pipe joint body is formed into a component having a shape which is symmetrical about the direction of the axis Y.

In the tubular screwing portion 1A, an external thread 7 is formed from the outer circumference of its tip end portion toward the basal end side, a tip-expanded inner circumferential surface 8 is formed on the inner circumference of its tip end portion, and a linear inner circumferential surface 9 having the same inner diameter is formed on the basal end side of the inner circumferential surface 8.

A linear outer circumferential surface 10 having a constant diameter is formed on the radially outward side of the small-diameter tubular portion 1*a*, and an inclined inner circumferential surface 5 having a tip-expanded shape in which the diameter is gradually increased as further advancing toward the tip end side in the direction of the axis Y is formed in a tip end portion on the radially inward side.

A tubular annular groove m is formed between the outer circumferential surface 10 of the one small-diameter tubular portion 1*a* and the inner circumferential surface 9 of the tubular screwing portion 1A.

In the pipe joint body 1, as shown in FIG. 4, the receiving port 1B has the same structure as the tubular screwing portion 1A, and the other small-diameter tubular portion 1*b* has the same structure as the one small-diameter tubular portion 1*a*. As the structure shown in FIG. 10, alternatively, the receiving port 1B and the other small-diameter tubular portion 1*b* may have another structure.

The union nut 2 is configured by a resin-made nut, and, in an inner circumferential portion, has an internal thread 13 which is screwed with the external thread 7 of the tubular screwing portion 1A, and an annular flange portion 12 which is located on the tip end side with respect to the internal thread 13, and which projects toward the radially inner side.

The inner diameter portion of the flange portion 12 is set as an inner circumferential surface 12*a* in which the diameter is substantially equal to or very slightly larger than the outer diameter of the tube 4 so that the tube 4 can pass therethrough. The basal end side of the flange portion 12 is configured as a pressing portion 12*b* that presses the tip-end side outer circumferential surface (outer circumferential surface of a tip-contracted press-contact portion 4*a*) of the tube end portion 4C into which the inner ring body 3A is press-inserted, in the direction of the axis Y of the pipe joint body 1.

Therefore, the pressing portion 12*b* is configured so that the portion is caused to press the tip-end side outer circumferential surface of the tube end portion 4C in the direction of the axis Y of the pipe joint body 1, by the screw advancement caused by screwing the internal thread 13 with the external thread 7 of the tubular screwing portion 1A.

Although the inner circumferential surface 12*a* of the flange portion 12 is drawn to have a constant diameter, the surface may be formed into a tapered inner circumferential surface in which the inner diameter is gradually increased as further separating from the internal thread 13 (as further approaching toward the tip end side in the direction of the axis Y).

As shown in FIGS. 1 to 5, the inner ring 3 has a tubular structure having the inner ring body 3A which is press-inserted into the tube end portion 4C from an opening of the tube 4, and a fitting tubular portion 3B which is on the basal end side of the inner ring body 3A, and which projects toward the basal end of the inner ring body 3A from the opening of the tube 4.

The inner circumferences of the inner ring body 3A and the fitting tubular portion 3B are formed into an inner circumferential portion 3*w* which has the same diameter, and which is uniform, and as a fluid passage.

In the inner ring body 3A, a flared portion 3*f* is formed in an outer circumferential portion 3G, and a tip-contracted outer-circumferential flared surface 3*a* is formed in the tip end side of the flared portion 3*f*. In the basal end side of the flared portion 3*f*, a maximum-diameter portion 3*b*, and a tip-expanded outer circumferential portion 3*c* which is in the basal end side of the maximum-diameter portion 3*b*, and in which the outer diameter is further decreased as further advancing toward the fitting tubular portion 3B are formed. A trunk outer circumferential portion (trunk outer circumferential surface) 3*d* having a constant outer diameter is formed in the basal end side of the tip-expanded outer circumferential portion 3*c*.

In the drawings of the application, the maximum-diameter portion 3*b* of the inner ring is drawn to have a structure having a constant axial length. Even in a structure corresponding to a boundary in which the outer-circumferential flared surface 3*a* is immediately changed to the tip-expanded outer circumferential portion 3*c*, there is no technical difficulty. In this case, the boundary 3*g* shown in FIG. 6 and the like coincides with the maximum-diameter portion 3*b*.

The tip-contracted outer-circumferential flared surface 3*a* of the flared portion 3*f* is formed into a convex curved surface in which the whole is radially outwardly convex, the maximum-diameter portion 3*b* is formed in the basal end side of the outer-circumferential flared surface 3*a*, and the outer-circumferential flared surface 3*a* and the maximum-diameter portion 3*b* are press-inserted into the tube end portion 4C, whereby the tube end portion 4C is deformed in a flared manner.

In a tip end portion of the inner ring body 3A, a cut-shaped deformation preventing portion 16 configured by an inner circumferential surface which is inclined so that the diameter becomes larger as further advancing toward the tip end of the axis P is formed. The deformation preventing portion 16 prevents a tip end portion side of the outer-circumferential flared surface 3*a* from, after the outer-circumferential flared surface 3*a* is press-inserted into the tube end portion 4C, deforming and projecting in the radial inward direction (toward the fluid passage). The deformation preventing portion 16 further prevents the tip end side of the outer-circumferential flared surface 3*a* from being further deformed and projected in the radial inward direction (toward the fluid passage) by the force and speed of the flow of the fluid, whereby the press contact force of the tip end portion of the outer-circumferential flared surface 3*a* is prevented from being reduced.

In the fitting tubular portion 3B, a projecting cylindrical portion 14 which is press-inserted into the annular groove m of the pipe joint body 1, and an annular small projection 15 which is located in the radial inward side of the projecting cylindrical portion 14, and which includes an inclined outer circumferential surface 11 are formed. In a basal end portion of the annular small projection 15, a cut-shaped deformation preventing portion 17 configured by an inner circumferential surface which is inclined so that the diameter becomes larger as further advancing toward the basal end of the axis P of the inner ring body 3A is formed. The deformation preventing portion 17 prevents the basal end side of the annular small projection 15 from deforming and projecting in the radial inward direction (toward the fluid passage).

The portion between the inclined outer circumferential surface 11 of the annular small projection 15 and the inner circumferential surface 14*a* of the projecting cylindrical portion 14 is formed into an annular recess. The small-diameter tubular portion 1*a* of the pipe joint body 1 is fitted into the recess. This fitting enables the inclined outer circumferential surface 11 of the annular small projection 15 and the inclined inner circumferential surface 5 of the small-diameter tubular portion 1*a* to be butted against each other.

The diameter difference (step difference) between the outer circumferential surface 3e of the fitting tubular portion 3B and the trunk outer circumferential portion 3d is set to be substantially equal to the thickness of the tube 4 so that a gap is not formed as far as possible between the outer circumferential surface 4B of the tube 4 and the inner circumferential surface 9 of the tubular screwing portion 1A.

In the tube 4, when the inner ring body 3A is press-inserted into the tube end portion 4C to flare and deform the tube end portion, the tip-contracted press-contact portion 4a which is press-contacted with the outer-circumferential flared surface 3a of the inner ring body 3A, a maximum flared press-contact portion 4b which is press-contacted with the maximum-diameter portion 3b of the inner ring body 3A, a tip-expanded press-contact portion 4c which is butted against the outer circumferential portion 3c of the inner ring body 3A, and a trunk press-contact portion 4d which is press-contacted with the trunk outer circumferential portion 3d of the inner ring body 3A are formed.

In the formation state, the diameter of an internal flow passage 4W configured by the inner circumferential surface of the tube 4, that of the inner circumferential portion 3w constituting the fluid passage of the inner ring 3, and that of the internal passage 6 of the pipe joint body 1 are set to have the same dimension d (see FIGS. 3 and 4), i.e., to be flush. However, the formation state is not limited to the case where the surface flush state is set.

After the inner ring body 3A is press-inserted into the tube end portion 4C of the tube 4, the tube is inserted and disposed into the pipe joint body 1. As shown in FIGS. 4 and 5, then, the internal thread 13 of the union nut 2 is screwed with the external thread 7 of the tubular screwing portion 1A of the pipe joint body 1, and screw advanced, thereby causing the pressing portion 12b of the union nut 2 to press the tip-end side outer circumferential surface (outer circumferential surface of the tip-contracted press-contact portion 4a) of the tube end portion 4C in the direction of the axis Y.

This pressing causes the projecting cylindrical portion 14 of the inner ring 3 to be press-inserted into the annular groove m of the pipe joint body 1, and the inclined outer circumferential surface 11 of the inner ring 3 to be butted against and press-contacted with the inclined inner circumferential surface 5 of the pipe joint body 1.

When the tube 4 into which the inner ring 3 is press-inserted as described above is inserted into and connected with the pipe-connecting device A, at least three seal portions (S1, S3, S4) are configured as described below.

The first seal portion S1 is a seal portion configured by: press contact between the tip-contracted press-contact portion 4a of the tube 4 and the outer-circumferential flared surface 3a of the inner ring body 3A; that between the maximum flared press-contact portion 4b of the tube 4 and the maximum-diameter portion 3b of the inner ring body 3A; that between the tip-expanded press-contact portion 4c of the tube 4 and the outer circumferential portion 3c of the inner ring body 3A; and the trunk press-contact portion 4d of the tube 4 and the trunk outer circumferential portion 3d of the inner ring body 3A.

A second seal portion S2 is a seal portion configured in the case where a structure in which the tip-expanded press-contact portion 4c of the tube 4 and the tip-expanded inner circumferential surface 8 in the tubular screwing portion 1A of the pipe joint body 1 are press-contacted with each other is employed.

The third seal portion S3 is a seal portion configured by: press contact between the outer circumferential surface of the fitting tubular portion 3B of the inner ring 3 and a basal end side portion of the inner circumferential surface 9 of the tubular screwing portion 1A of the pipe joint body 1; and further press contact between the fitting tubular portion 3B, more specifically the inner circumferential surface 14a of the projecting cylindrical portion 14, and the outer circumferential surface 10 of the small-diameter tubular portion 1a of the pipe joint body 1.

The fourth seal portion S4 is a seal portion configured by press contact due to collision butting between the inclined outer circumferential surface 11 of the annular small projection 15 of the inner ring 3 and the inclined inner circumferential surface 5 of the small-diameter tubular portion 1a of the pipe joint body 1.

The configuration of the first, third, and fourth seal portions S1, S3, S4 prevents the fluid flowing through the tube 4, the inner ring 3, and the pipe joint body 1 from entering between contact surfaces of the tubular screwing portion 1A of the pipe joint body 1 and the tube end portion 4C to leak therefrom, and attains a perfect seal.

When, among the first, third, and fourth seal portions S1, S3, S4, the first seal portion S1 is surely sealed, the fluid does not enter nor leak from between the tubular screwing portion 1A of the pipe joint body 1 and the tube end portion 4C, and a satisfactory seal is ensured. In order to ensure a more perfect seal, however, it is preferable to dispose at least one of the third seal portion S3 and the fourth seal portion S4.

In the first seal portion S1, the press contact between the tip-contracted press-contact portion 4a of the tube 4 and the outer-circumferential flared surface 3a of the inner ring body 3A is configured in the following manner.

As shown in FIG. 3, namely, a sectional shape of the outer-circumferential flared surface 3a along the direction of the axis P of the inner ring body 3A is formed so as to constitute a convex curved surface passing through: a first place e1 which is the maximum-diameter portion 3b of the flared portion 3f; a second place e2 which is the tip end on the side of the tube press insertion; and a third place e3 which is between the first place e1 and the second place e2, and in which the diameter is equal to the outer diameter D of the tube 4 with respect to the axis P.

In FIG. 3, for example, the first place e1 is a place where, in the maximum-diameter portion 3b of the flared portion 3f, is the tip end on the side of the tube press insertion, and the angle $\alpha$ formed by the tangential line L of the outer-circumferential flared surface 3a in the third place e3 and the axis P is 30 to 60 degrees ($30° \leq \alpha \leq 60°$).

More specifically, in FIG. 3, the sectional shape of the outer-circumferential flared surface 3a along the axis P is defined as an arc (a three point arc or a three point curve) which passes through the above-described three points or the first to third places e1 to e3, which has a center i, and which has a radius R. In the shape drawn in FIG. 3, the boundary between the outer-circumferential flared surface 3a and the deformation preventing portion 16 is the first place e1, that between the outer-circumferential flared surface 3a and the maximum-diameter portion 3b is the second place e2, and the tangential angle $\alpha \approx 42$ degrees.

The outer diameter D of the tube 4 is the diameter of the outer circumferential surface 4B. In FIG. 3, the center i of the arc of the radius R is in the vicinity of the axis P, but the position is variously changed in accordance with conditions of the tangential angle $\alpha$ and the like.

In the configuration, in this way, the tip-contracted outer-circumferential flared surface 3a is formed into a convex curved surface which is defined as described above, the following effects are attained.

Figure 6:
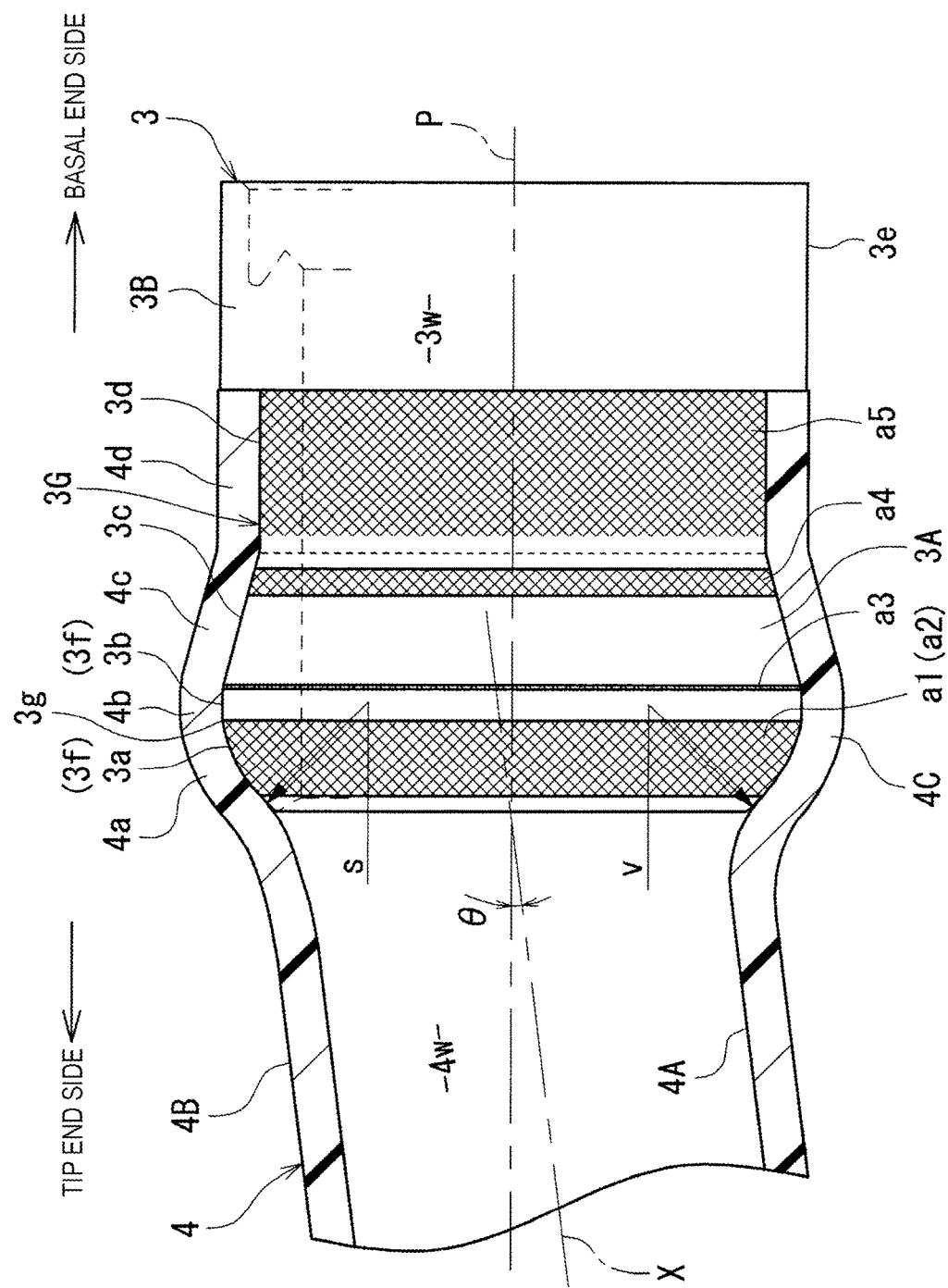
FIG. 6 is a sectional view showing a press-contacted situation in the case where the inner ring of FIG. 1 is inclinedly press-inserted into an end portion of the tube.

It is assumed that, since the inner ring body 3A is press-inserted into the tube end portion 4C and inclinedly press-inserted, a relative angle θ exists between the axis P of the inner ring body 3A and the axis X of the tube as shown in FIG. 6.

Even in an unanticipated situation in which the inner ring body is inclinedly press-inserted, a first press-contact portion a1 is formed between the outer-circumferential flared surface 3a of the inner ring body 3A and the tip-contracted press-contact portion 4a of the tube 4, and the first press-contact portion a1 can attain press contact which has a ring-like shape that is not intermittent in the circumferential direction, and which has an area that is wide in the direction of the axis P.

Namely, the press contact of the area having a large width does not depend on the material, thickness, and flare amount of the tube 4, and exactly can be press contact which is continuously integrated from the first press-contact portion a1 of the conventional art shown in FIG. 6 to the second press-contact portion a2.

When the relative angle θ exists between the axis P of the inner ring body 3A and the axis X of the tube, the bending (flared bending) of a portion which changes in a flared manner from the free diameter portion (the portions which are designated by the reference numerals 4A and 4B in FIG. 6) of the tube 4 to the tip-contracted press-contact portion 4a is gentle in a bending-direction outward portion s of the tube 4 as shown in FIG. 6. Therefore, a state where the tip-contracted press-contact portion 4a is pressed against the outer-circumferential flared surface 3a of the inner ring body 3A is formed, and a strong press-contact state is attained.

In a bending-direction inward portion v of the tube 4, the bending (flared bending) of a portion which changes in a flared manner from the free diameter portion of the tube 4 to the tip-contracted press-contact portion 4a changes steeply (abruptly) to exert a function of separating the outer-circumferential flared surface 3a of the inner ring body 3A and the tip-contracted press-contact portion 4a from each other, and a weak press-contact state is obtained.

In the configuration of the application, however, the annular first press-contact portion a1 having an area that is wide as described above is realized (maintained) also in the bending-direction inward portion v where the press contact is weak, and sufficient press contact can be performed. Therefore, it is possible to eliminate the conventional defect that the surface-pressure reduced portion n or the non-contact portion n is produced.

Figure 7:
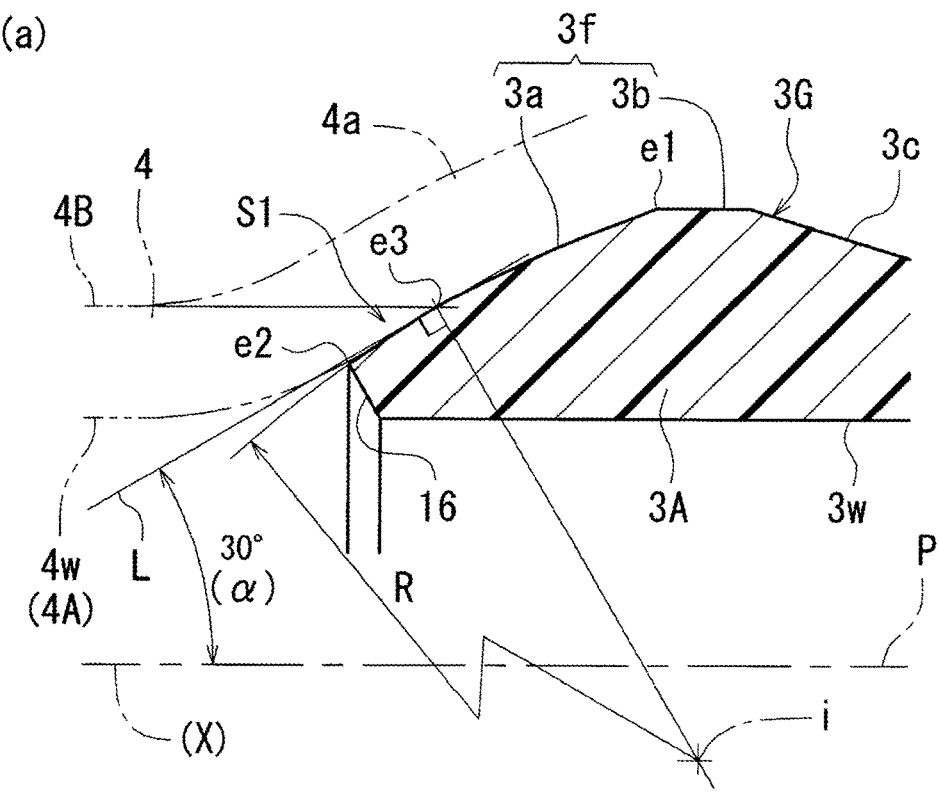
FIG. 7 shows the shape of the tip-end side of the inner ring, (a) shows a case where the tangential angle in a third place is 30 degrees, and (b) shows a case where the tangential angle in the third place is 60 degrees.
Figure 7:
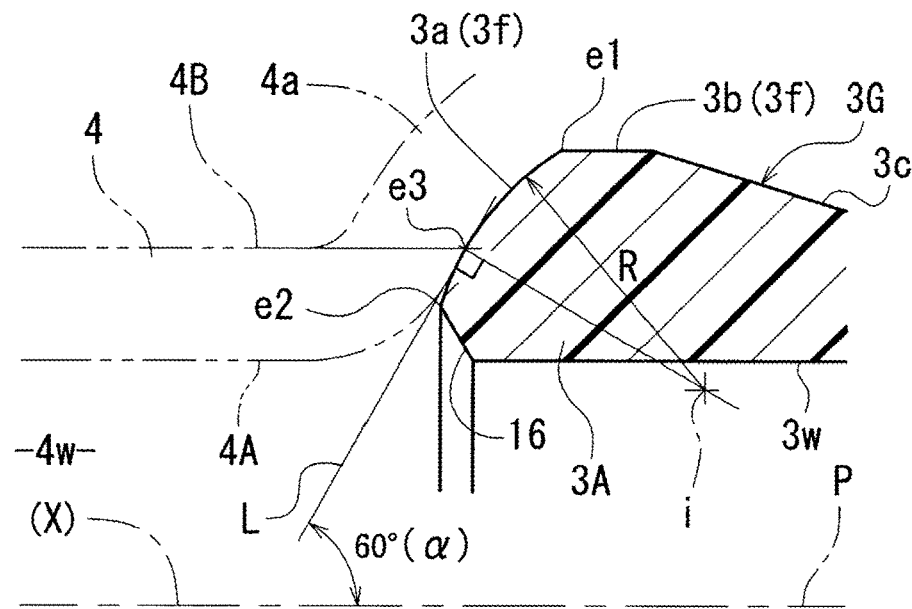

For reference, FIG. 7(a) shows the tip end portion of the inner ring in a case where the tangential angle α is 30 degrees, and FIG. 7(b) shows the tip end portion of the inner ring in a case where the tangential angle α is 60 degrees. The figures are exemplified views of a section of main portions. In FIGS. 7(a) and (b), the inner ring 3 has different shapes and dimensions in the portion from the outer-circumferential flared surface 3a to the tip end side, but has the same shape and dimensions in the portion from the maximum-diameter portion 3b to the basal end side.

In any case, the tube 4 is smoothly flared so as to attain a state where the tube 4 extends along the outer-circumferential flared surface 3a, and press-inserted into the inner ring 3.

In the case where, as described above, the satisfactory first press-contact portion a1 which has an area that is wide in the direction from the tip end portion of the inner ring 3 toward the basal end side of the axis P, and which has a nonintermittent annular shape is formed between the outer-circumferential flared surface 3a of the inner ring body 3A and the tip-contracted press-contact portion 4a of the tube 4, even when the fluid is a highly penetrative liquid, it is possible to prevent the defect that, as in the conventional art shown in FIG. 13, the inner ring body 3A is inclinedly press-inserted, the fluid is caused by the capillary action or the like to penetrate from the non-contact portion n into the gap portion k between the outer-circumferential flared surface 3a of the inner ring body 3A and the tip-contracted press-contact portion 4a of the tube 4.

The conventional defect that the old fluid which is previously flown and collected in the gap portion k oozes out from the non-contact portion n, and is mixed with the replaced new fluid, and, because of the mixture, the purity of the new fluid is lowered, and the replaced new fluid is modified can be eliminated by the first press-contact portion a1. Furthermore, it is possible to eliminate the other defect that a lot of time, washing fluid, and replacement fluid are consumed in washing and replacement.

Figure 11:
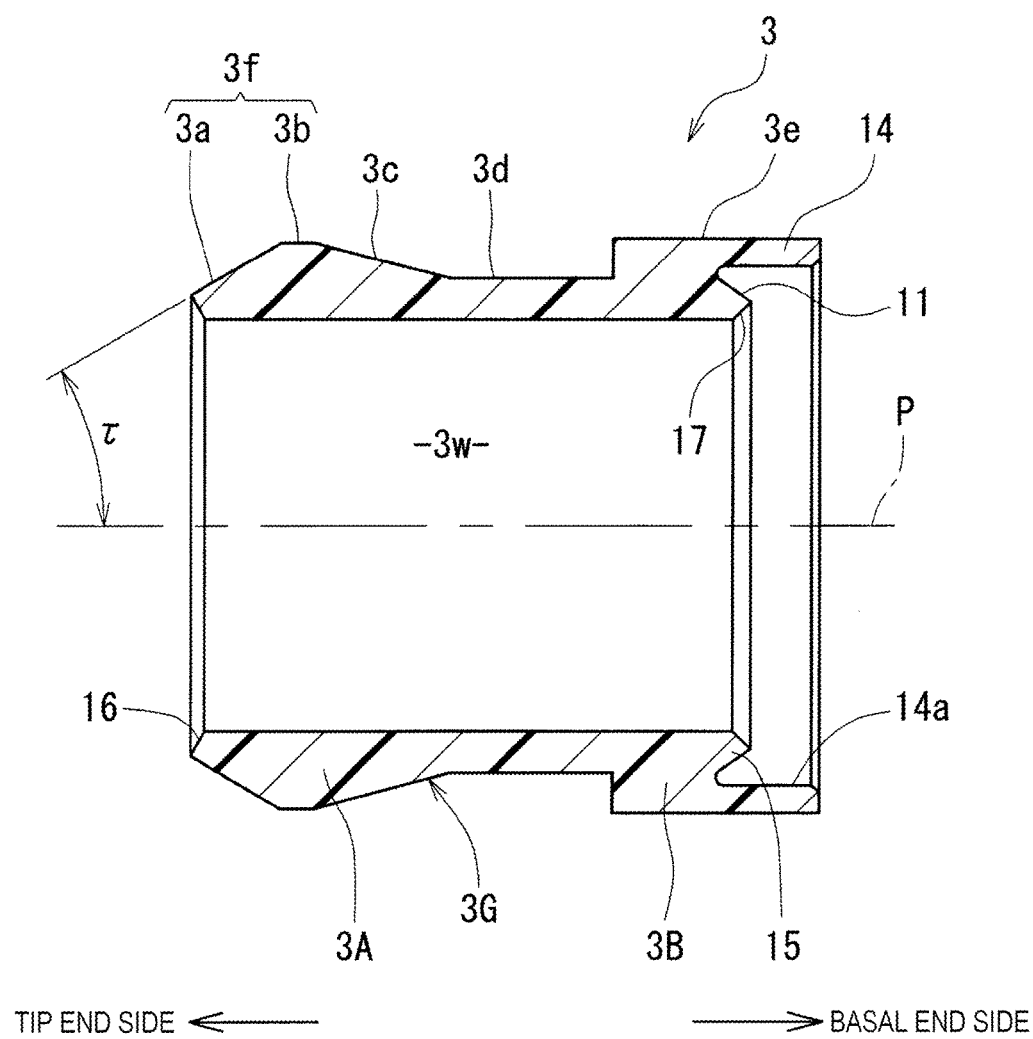
FIG. 11 is a sectional view showing a conventional inner ring.
Figure 12:
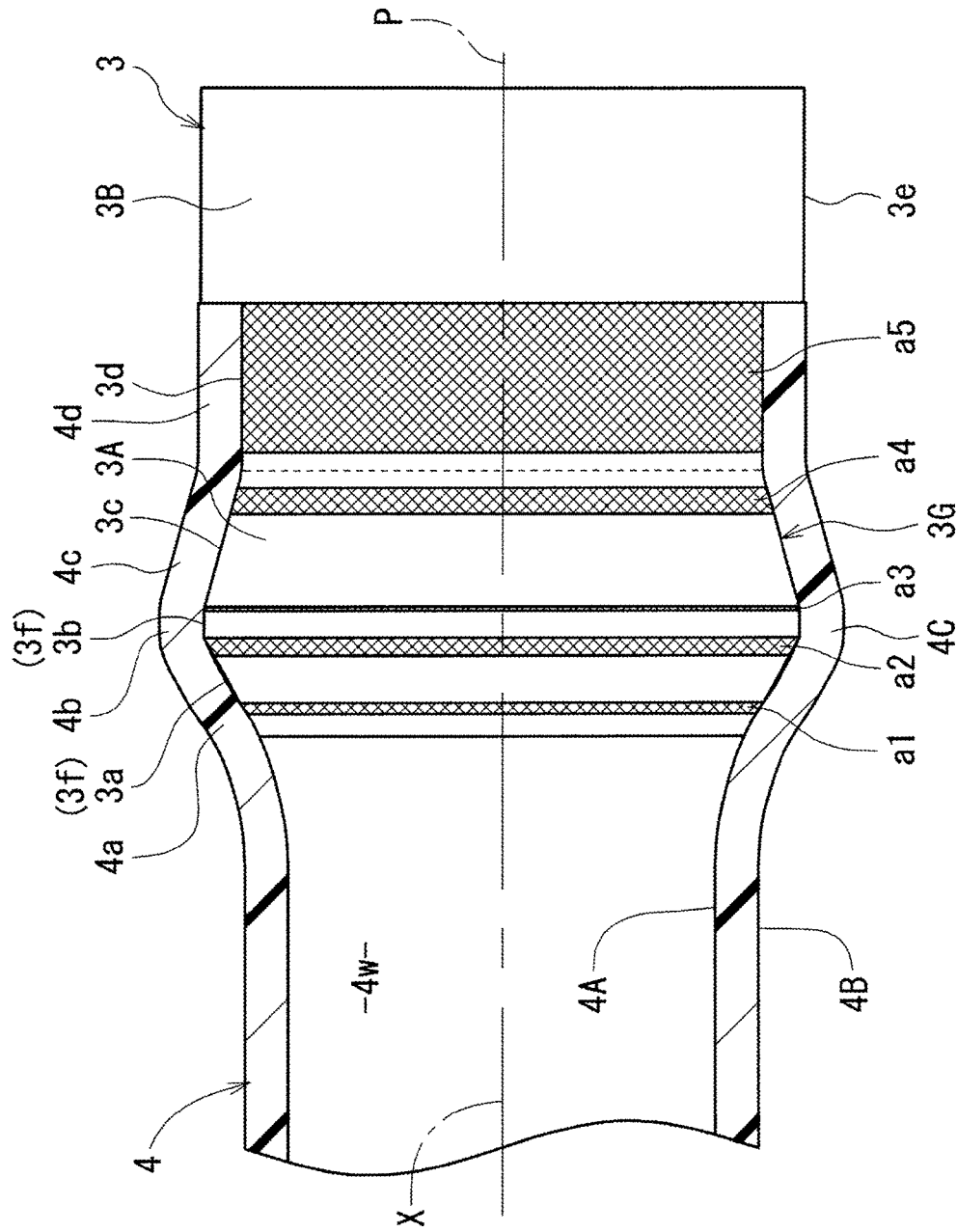
FIG. 12 is a sectional view showing a situation of adequate press contact between the conventional inner ring and a tube.

As a structure that is different from the invention in which, as described above, the outer-circumferential flared surface 3a of the inner ring body 3A has a large diameter, and a convex curved surface, it is contemplated that means for further reducing the angle with respect to the axis P as compared to that with respect to the outer-circumferential flared surface 3a of the conventional inner ring body 3A shown in FIG. 11, i.e., means for further reducing the angle t of the outer-circumferential flared surface 3a of a tip-contracted conical surface may be employed.

In order that a first press-contact portion which is not circumferentially intermitted is obtained by this means, however, the length in the direction of the axis P is inevitably considerably prolonged. In this case, the length of the inner ring body 3A is largely increased as compared to the present situation (FIG. 11). In the case where there is a relative angle between the axis P of the inner ring body 3A and the axis X of the tube, in addition, the press contact between the tube 4 and the inner ring 3 in a bending-direction inward portion (see "bending-direction inward portion v" shown in FIG. 6) becomes weak as described above, and there is a possibility that penetration may occur.

Figure 8:
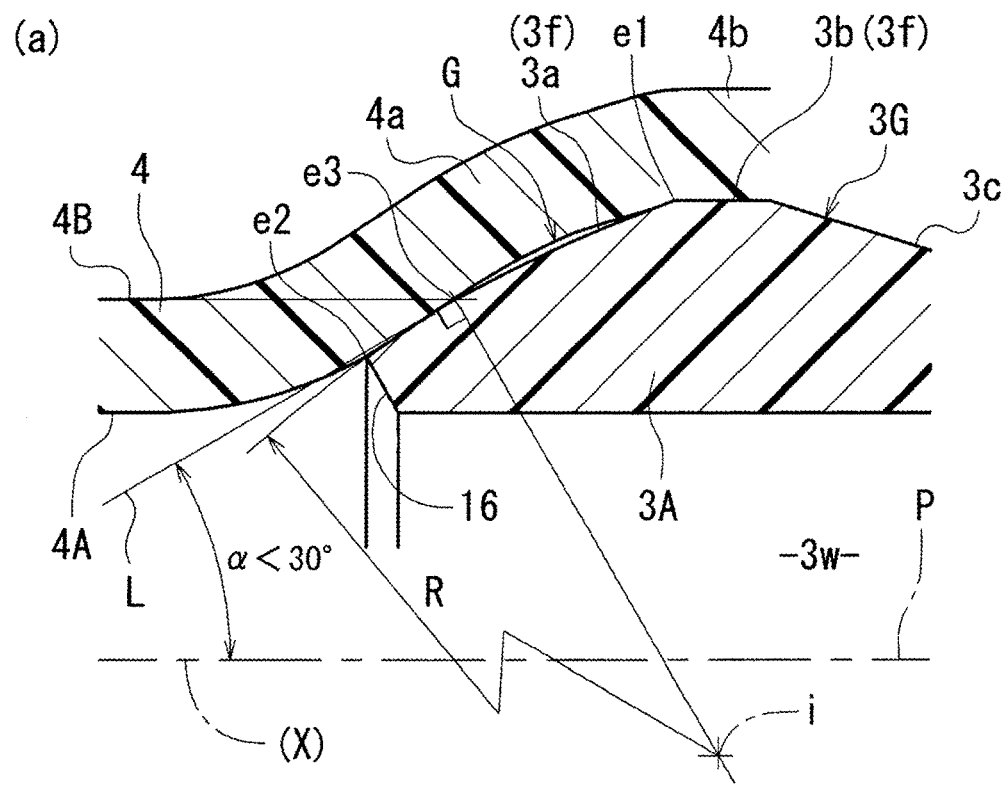
FIG. 8 shows an inadequate fitted state of the inner ring and the tube, (a) shows a case where the tangential angle in the third place is smaller than 30 degrees, and (b) shows a case where the tangential angle in the third place is larger than 60 degrees.
Figure 8:
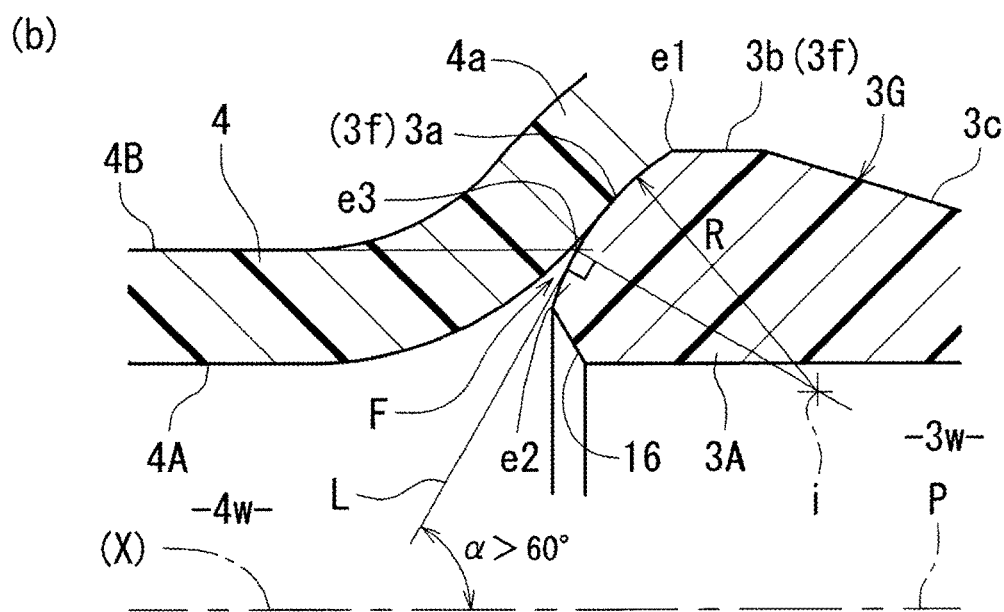

In the case where the tangential angle α in the third place e3 is larger than 60 degrees (α>60°), the radius (curvature) R of the outer-circumferential flared surface 3a in the direction along the axis P is reduced as shown in FIG. 8(b). In this case, the press insertion load for the tube 4 is large, a strong force is required in the insertion of the inner ring 3, and reduction of the mechanical properties of the tube material, i.e., modification of the tube material is caused by rapid flaring of the tube. In addition, for example, there arises a necessity to soften the tube 4 by heating. Therefore, the possibility that the tube is modified is increased.

In the case where press insertion is performed in this way, as shown in FIG. 8(b), bending in the flared portion extending from the natural-diameter portion of the tube 4 to the press-contact portion 4a cannot follow the outer-circumferential flared surface 3a, the contact area itself (see a1 in FIG. 6) between the both portions is reduced, and a stable sealing function cannot be expected. In addition, a portion where the tube 4 cannot extend along the outer-circumferential flared surface 3a, i.e., a separating portion F is largely produced to form a liquid pool, and a possibility that the liquid replacement property is adversely affected is large.

By contrast, in the case where the tangential angle α in the third place e3 is smaller than 30 degrees (α<30°), the radius (curvature) R of the outer-circumferential flared surface 3a in the direction along the axis P is increased as shown in FIG. 8(a), and a gently curved surface is formed. In this case, the tube 4 cannot be deformed along the gently curved surface, and there arises an inconvenience that a gap G is formed between the tube inner circumferential surface 4A and the outer-circumferential flared surface 3a. This produces a contact state which is similar to the conventional inconvenient state, and is not preferable.

When the tangential angle α is smaller than 30 degrees or larger than 60 degrees, various inconveniences are easily produced as described above. Therefore, it is preferable that the tangential angle α is 30 to 60 degrees.

Although, in Embodiment 1, the outer-circumferential flared surface 3a of the inner ring body 3A is formed into a spherical convex curved surface, the shape of the outer-circumferential flared surface 3a is not limited to a spherical shape, and may be a smooth convex curved surface such as a catenary curved surface.

As described above, the outer-circumferential flared surface 3a and the tip-contracted press-contact portion 4a can be set to a press-contact state without increasing the dimension of the outer-circumferential flared surface 3a in the direction of the axis P, and a strip-like press-contact portion which is wide in the axial direction can be formed. Therefore, it is possible to prevent the conventional defect (penetration possibility) from occurring.

Embodiment 2

Figure 9:
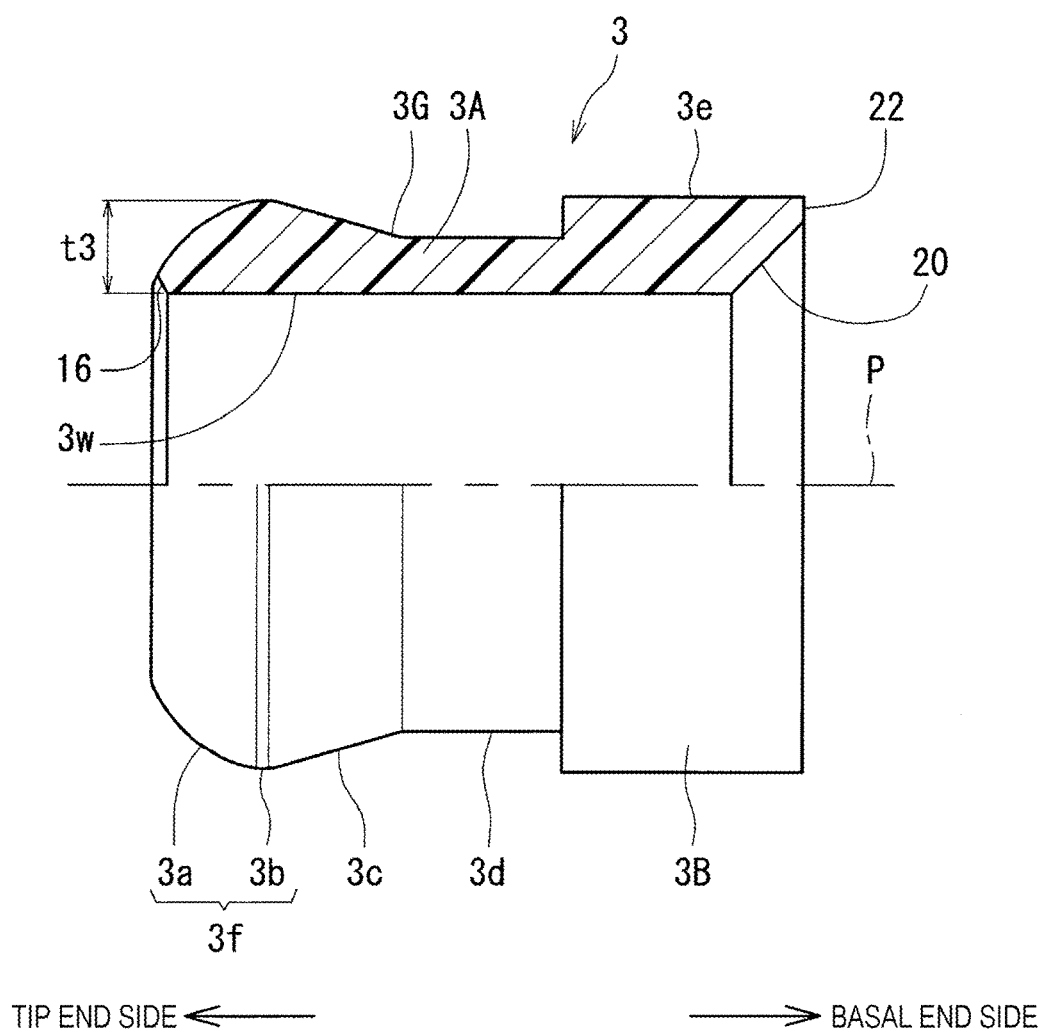
FIG. 9 is a sectional view of an inner ring (Embodiment 2).
Figure 10:
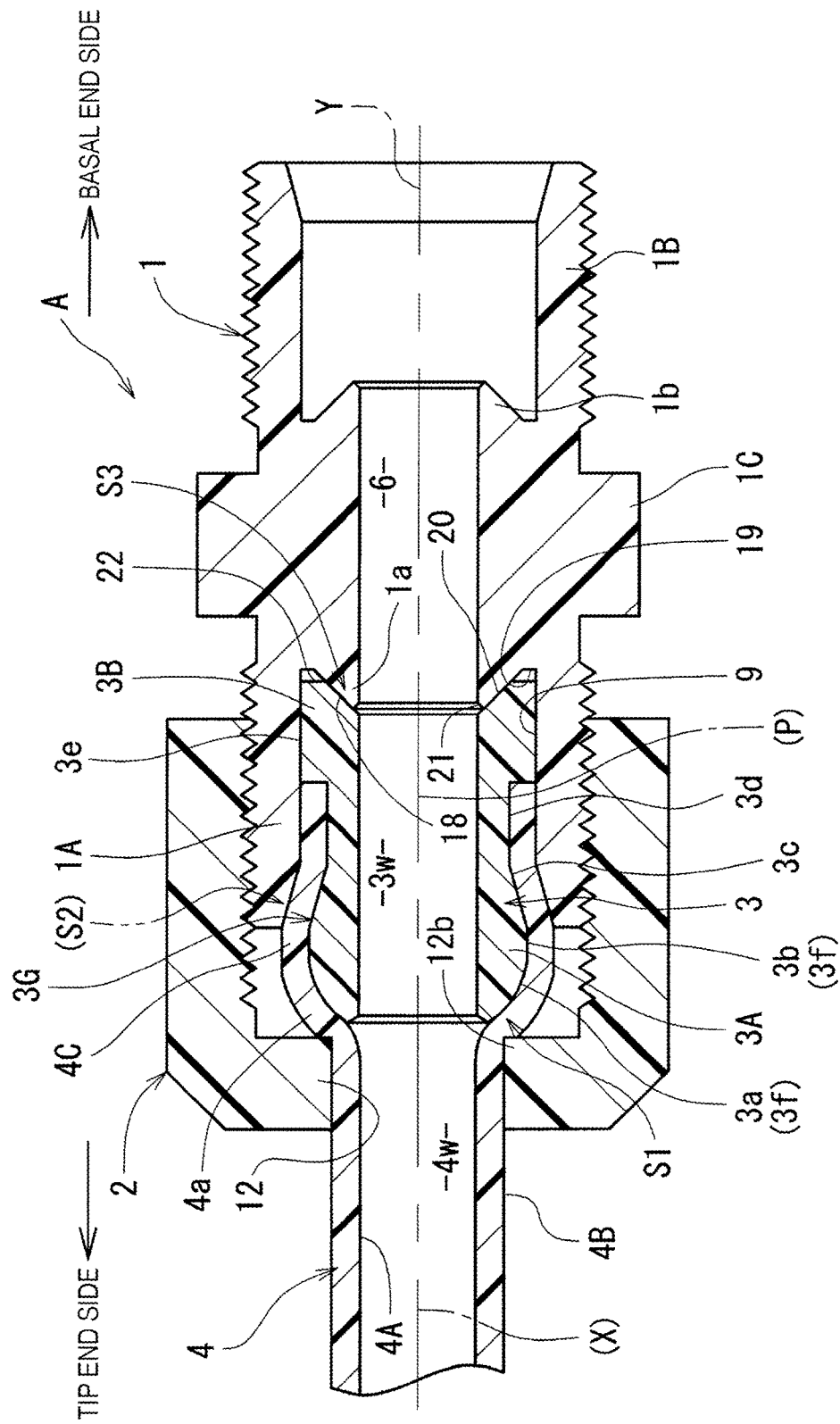
FIG. 10 is a sectional view of a state where a tube is connected to a pipe connecting device by using the inner ring of FIG. 9.

As shown in FIGS. 9 and 10, an inner ring 3 of Embodiment 2 is different from the inner ring of Embodiment 1 only in the configuration of the fitting tubular portion 3B. Because of this difference, also in the pipe-connecting device A, the configuration of the fitting tubular portion 3B of the pipe joint body 1 is different. In FIG. 10, the receiving port 1B and the other small-diameter tubular portion 1b are drawn in the same manner as those of the pipe joint body 1 shown in FIG. 4.

In the fitting tubular portion 3B of the inner ring 3, namely, the outer circumferential surface 3e, the inner circumferential portion 3w, and a tip-contracted inner circumferential surface 20 which is tip-contracted as advancing toward the tip end of the inner ring 3 in the basal end side are formed. In the pipe joint body 1, by contrast, the tip-contracted small-diameter tubular portion 1a having an outer circumferential surface 18 in which the diameter is further reduced as advancing toward the tip end portion of the pipe joint body 1 is formed on the radially inward side of a root portion of the tubular screwing portion 1A, and a tip-expanded annular groove 19 into which the basal end side of the fitting tubular portion 3B is fitted is formed between the outer circumferential surface 18 of the small-diameter tubular portion 1a and the inner circumferential surface 9 of the tubular screwing portion 1A.

In the tip end portion of the small-diameter tubular portion 1a, the tip end side of the small-diameter tubular portion 1a is deformed and projected in the radial inward direction (toward the fluid passage), thereby forming a cut-shaped deformation preventing portion 21 for preventing the fluid from entering and staying.

In the case of Embodiment 2, the union nut 2 is screw-advanced by being screwed with the tubular screwing portion 1A of the pipe joint body 1, and turned in the fastening direction. Then, the tip-end side outer circumferential surface (outer circumferential surface of the tip-contracted press-contact portion 4a) of the tube end portion 4C is pressed in the direction of the axis Y by the pressing portion 12b of the union nut 2.

This causes the basal end side of the fitting tubular portion 3B of the inner ring 3 to be press-inserted into the annular groove 19 of the pipe joint body 1, and the tip-contracted outer circumferential surface 18 (an example of the seal configuring portion) of the pipe joint body 1 and the tip-contracted inner circumferential surface 20 (an example of the seal element portion) of the inner ring 3 to be butted against and press-contacted with each other, and the third seal portion (an example of the inner seal portion) S3 is configured.

In order to enable the third seal portion S3 to perfectly function, i.e., in order to prevent the basal end side of the fitting tubular portion 3B from being butted against the bottom surface of the annular groove 19 to cause the tip-contracted inner circumferential surface 20 to enter a state where the inner circumferential surface is not press-contacted with the outer circumferential surface 18 of the tubular screwing portion 1A, the end surface of the basal end side of the fitting tubular portion 3B is formed into a cut-shaped butting avoiding portion 22.

The connection of the tube 4 and the pipe joint body 1 by using the inner ring 3 of Embodiment 2 is similar to that in the configuration of Embodiment 1 shown in FIGS. 4 and 5 except the configuration of the third seal portion S3 (the inner seal portion). Therefore, the reference numerals in FIGS. 4 and 5 are used also in FIGS. 9 and 10, and their description is omitted.

OTHER EMBODIMENTS

It is matter of course that the connection of the tube 4 into which the inner ring 3 is press-inserted is not limited to the pipe-connecting device A (pipe joint) of Embodiments 1 and 2. A connection with the pipe-connecting device A (pipe joint) having another mode may be performed without departing from the invention. It is matter of course that the tube 4 into which the inner ring 3 is press-inserted may be connected to a pipe-connecting device configured by a fluid apparatus such as a pump or a valve.

DESCRIPTION OF REFERENCE NUMERALS 1a seal configuring portion
3A inner ring body
3G outer circumferential portion
3a outer-circumferential flared surface
3b maximum-diameter portion
3f flared portion
4 tube
4C end portion
14, 15 seal element portion
A pipe-connecting device
D outer diameter of tube
P axis (axis of inner ring)
S3, S4 inner seal portion
e1 first place
e2 second place
e3 third place
m seal configuring portion

The invention claimed is:
1. A pipe-connecting device comprising:
a resin-made tube; and,
an inner ring in which a flared portion is formed in an outer circumferential portion of an inner ring body that is to be press-inserted into the resin-made tube, said inner ring body having a tip-contracted outer-circumferential flared surface formed in a tip end side of the flared portion, said tip-contracted outer-circumferential flared surface being press-inserted into an end portion of the resin-made tube to cause the end portion of the resin-made tube to be flared and deformed, wherein:

a section shape of the outer-circumferential flared surface in a direction extending along an axis of the inner ring body is formed into a convex curved surface passing through a first place, which is a maximum-diameter portion of the flared portion, a second place, which is the tip-end side of the flared portion of the inner ring body, and a third place, which is between the first place and the second place, and in which a diameter is equal to an outer diameter of the tube with respect to the axis, the convex curved surface being defined as an arc having a center at a location farther than the axis with respect to the outer-circumferential flared surface in a radial direction, and, an angle $\alpha$ formed by a line extending tangential to the outer-circumferential flared surface in the third place and the axis is 30 to 60 degrees ($30° \leq \alpha \leq 60°$).

2. The pipe-connecting device according to claim 1, wherein seal element portions, which are press-contacted with seal configuring portions disposed in the pipe connecting device to constitute inner seal portions, are formed in a basal-end side of the inner ring body.

* * * * *